(12) United States Patent
Algüera et al.

(10) Patent No.: US 8,382,069 B2
(45) Date of Patent: Feb. 26, 2013

(54) SUPPORT JACK WITH SUPPORTING LOAD INDICATOR

(75) Inventors: José Manuel Algüera, Aschaffenburg (DE); Swen Saupe, Mainz (DE)

(73) Assignee: Jost-Werke GmbH, Neu-Isenburg (DE)

( * ) Notice: Subject to any disclaimer, the term of this patent is extended or adjusted under 35 U.S.C. 154(b) by 1432 days.

(21) Appl. No.: 11/989,248

(22) PCT Filed: Jul. 20, 2006

(86) PCT No.: PCT/EP2006/007142
§ 371 (c)(1),
(2), (4) Date: Jan. 23, 2008

(87) PCT Pub. No.: WO2007/012423
PCT Pub. Date: Feb. 1, 2007

(65) Prior Publication Data
US 2009/0272952 A1 Nov. 5, 2009

(30) Foreign Application Priority Data

Jul. 27, 2005 (DE) .......................... 10 2005 036 139

(51) Int. Cl.
*B60S 9/02* (2006.01)
*B66F 7/26* (2006.01)
*B66F 3/08* (2006.01)
*B66F 3/00* (2006.01)
*B62D 61/02* (2006.01)
*B62K 11/00* (2006.01)
*B62M 7/00* (2010.01)
*B60S 9/08* (2006.01)

(52) U.S. Cl. ............ 254/424; 254/45; 254/98; 254/134; 180/219

(58) Field of Classification Search ................... 254/424, 254/45, 98, 134, 420; 180/219, 24.01, 41
See application file for complete search history.

(56) References Cited

U.S. PATENT DOCUMENTS 2,555,336 A * 6/1951 Hagely .......................... 254/424
2,771,787 A * 11/1956 Dixon .......................... 74/89.35
(Continued)

FOREIGN PATENT DOCUMENTS
DE  197 56 426 A1  7/1999
DE  102 01 559 A1  10/2002
(Continued)

*Primary Examiner* — Lee D Wilson
*Assistant Examiner* — Alvin Grant
(74) *Attorney, Agent, or Firm* — Hudak, Shunk & Farine Co. LPA

(57) ABSTRACT

A support jack with a vertically telescopically displaceable supporting element having an outer sleeve and an inner sleeve is described. For the operator, it is sometimes hard to discern whether the support jacks find an adequate abutment on the ground. In an extreme case, the support jack sinks into the ground under the load of the vehicle. The vehicle is then no longer adequately supported and can tip over. For this reason, the object of the invention is to develop a support jack in such a way that secure standing is already discernible for the operator during extension of the supporting element. According to the invention, the object is achieved with a support jack in which a supporting load indicator with a pressure element is arranged on the supporting element, the pressure element triggering a signal when a predefinable supporting force is reached.

16 Claims, 4 Drawing Sheets

U.S. PATENT DOCUMENTS

| | | | |
|---|---|---|---|
| 2,952,473 A * | 9/1960 | Legge | 280/6.153 |
| 3,269,685 A * | 8/1966 | Wallace | 248/346.05 |
| 3,523,698 A | 8/1970 | Bishop | |
| 3,834,731 A * | 9/1974 | Uehara | 280/766.1 |
| 3,885,813 A * | 5/1975 | Kern | 280/763.1 |
| 4,084,830 A * | 4/1978 | Daniel et al. | 254/424 |
| 4,097,840 A | 6/1978 | Chappelle | |
| 4,109,733 A * | 8/1978 | Dummer | 173/4 |
| 4,572,527 A | 2/1986 | Stafford-Mills et al. | |
| 4,817,977 A * | 4/1989 | Bookbinder | 280/304 |
| 4,913,458 A * | 4/1990 | Hamilton | 280/6.153 |
| 5,061,832 A * | 10/1991 | Squires | 200/83 J |
| 5,143,386 A | 9/1992 | Uriarte | |
| 5,661,278 A * | 8/1997 | Atkinson et al. | 200/83 J |
| 6,091,034 A * | 7/2000 | Glassburn et al. | 200/83 P |
| 6,102,438 A * | 8/2000 | Few et al. | 280/763.1 |
| 6,176,495 B1 * | 1/2001 | Decker | 280/6.153 |
| 6,361,023 B1 * | 3/2002 | Peavler | 254/424 |
| 7,134,829 B2 * | 11/2006 | Quenzi et al. | 414/482 |
| 7,423,392 B2 * | 9/2008 | Gill | 318/268 |
| 2003/0122347 A1 | 7/2003 | Walters | |
| 2004/0178399 A1 * | 9/2004 | Blodgett et al. | 254/424 |

FOREIGN PATENT DOCUMENTS

| | | |
|---|---|---|
| EP | 1 026 057 A1 | 8/2000 |
| EP | 1 104 369 B1 | 1/2003 |
| FR | 2 491 048 A | 4/1982 |
| WO | WO 2005/003014 A2 | 1/2005 |
| WO | WO 2005/042319 A1 | 5/2005 |

* cited by examiner

SUPPORT JACK WITH SUPPORTING LOAD INDICATOR

FIELD OF INVENTION

The invention concerns a support jack with a vertically telescopically displaceable support element having an outer sleeve and an inner sleeve.

BACKGROUND OF THE INVENTION

Such support jacks are often mounted on semitrailers or trailers in general and they support them especially in a non-coupled condition. The support jacks are made from rectangular tubes, which are inserted one into the other and can move relatively to each other, such as is known for example from EP 1 104 369 B1.

Furthermore, support jacks are used for silo vehicles, in which a silo container with vehicle stationary is set up from a lying to a nearly upright position for emptying. In this upright position, the vehicle is quite susceptible to tipping over, so that it is necessary to prop up the rear of the vehicle, preferably with support jacks arranged on either side. During the extending of the support jacks, the operator must make sure that the ground is as level as possible, with sufficient carrying capacity, and may have to provide underpinning on the ground in the region of the support jack so that the vehicle is stable and cannot tip over.

At times it may even happen that the operator by accident extends only one of the two support jacks.

The operator can scarcely determine whether the support jacks find a sufficient abutment on the ground beneath them. In an extreme situation, the support jack will sink under the load of the vehicle into the ground. Then the vehicle is no longer sufficiently supported and it may tip over.

SUMMARY OF THE INVENTION

For this reason, the underlying problem of the invention is to modify a support jack so that a secure standing can already be recognized by the operator when the support element is extended.

The problem is solved according to the invention with a support jack in which a supporting load indicator with a pressure element is arranged on the support element, and the pressure element triggers a signal upon reaching a predetermined supporting force.

The benefit of the invention is that the operator will extend the support jack until the support jack takes on a predetermined supporting load. When the ground is soft, it may happen that the support jack will sink by one foot vary far into the ground until the signal appears after reaching a predetermined supporting load. It can also happen that the support jack produces no supporting force at all in the ground and therefore no signal is sent at all. In these cases, the operator knows that he must provide underpinning beneath the support jack or look for another parking position.

Preferably, the pressure element comprises a spring element and a switch element cooperating with it. Thanks to the geometrical and/or intrinsic material properties of the spring element, the size of the predetermined supporting force can be influenced by design steps. When this minimum supporting force is exceeded, a reversible deformation of the spring element will occur, thereby activating the switch element.

The familiar support jacks usually have a bearing plate arranged stationary in the outer sleeve, in which a spindle is held, which can move in the axial direction with respect to the bearing plate, and the spindle has a bearing ring, which thrusts against the bearing plate when a supporting force is initiated. In this embodiment, it has proven to be advantageous for the spring element to be arranged between the bearing plate and the bearing ring. The spindle is mounted in a bearing ring fastened to the spindle and fixed in the axial direction. When load is taken up, the spindle usually has a vertical play of 1.5 mm to 2.0 mm relative to the bearing plate, which is stationary in the outer sleeve. This play is bounded at the top by the fact that the bearing ring when the supporting load is taken up comes to bear with its top side against the bottom side of the bearing plate.

The spring element is installed in the free space between bearing ring and bearing plate that becomes closed when load is taken up. Force is then applied to the spring element via the bearing ring of the spindle, and the spring element finds an abutment against the bearing plate.

The spring element can be configured, for example, as a plate spring. These are easily procured as standardized parts and can be designed, for example, to handle a load of 1 ton to 2 tons. Instead of a plate spring, it would also be possible to use a leaf spring, for example.

Preferably, the switch element is arranged in the bearing plate. At this position, the switch element is especially favorably located in the range of operation of the spring element. Alternatively, the switch element could also be positioned in the wall of the outer sleeve.

Preferably, the switch element is a mechanical push button. This can be brought from an open to a closed switch position by the spring element. In this way, no energy is needed in the open switch position or to carry out the switching process. Alternatively to this embodiment, noncontact, electromagnetic, and capacitive sensors can also be used as the switch element. If need be, the switch element would be adapted appropriately in terms of its material or be outfitted with permanent magnets, for example.

Preferably, the supporting load indicator is connected to a first indicator device. The indicator device is arranged in or outside of the support jack in such a way that it lies within the visual field of the operator during the extending of the support element.

An especially favorable position for the indicator device is the cover of the housing of the support element, since this can easily be exchanged as a module in event of defect.

If the support jack is mounted on a vehicle, the support element can in one particular embodiment of the invention comprise a tilt indicator with a tilt sensor, which triggers a signal when it reaches a predetermined essentially horizontal orientation of the vehicle transverse to its direction of travel. In this way, the operator can determine especially precisely whether the vehicle is horizontally oriented, even when visual conditions are poor.

Both the tilt indicator and the supporting load indicator can be connected to an evaluation unit. The measured values can be stored in the evaluation unit for a lengthy period of time, so that after a tilting over of a vehicle one can determine whether the support jacks were set up on supportive ground and the vehicle was standing with a sideways tilt even before the silo container was lifted up. Furthermore, a predetermined setpoint value can be entered in the evaluation unit, which for example allows a sideways tilting of the vehicle by +/−4° and only switches to an enable signal at higher values.

It can also be provided that the evaluation unit puts out a control signal, which acts on the control system of the vehicle in such a way that a tilting of the container is blocked or enabled. This would further rule out the possibility of operator error.

Advantageously, the supporting load indicator and the tilt indicator are powered from the same energy source, which can likewise be arranged in the support element, preferably in the cover of the housing.

Preferably, the tilt indicator is connected to the first indicator device and/or to a second indicator device, while the second indicator device should likewise be arranged on the support element.

The signal action can be effectively realized in that the first and/or second indicator device has an optical and/or mechanical and/or acoustical indicator element.

An especially compact design can be achieved when one of the indicator devices, the energy source, and possibly also the evaluation unit are integrated into the housing cover. All structural parts can be injection molded into the housing cover for protection against moisture and damage.

BRIEF DESCRIPTION OF THE DRAWINGS

For a better understanding, the invention shall be explained below by means of 4 drawings. These show.

DETAILED DESCRIPTION OF THE INVENTION

Figure 1:
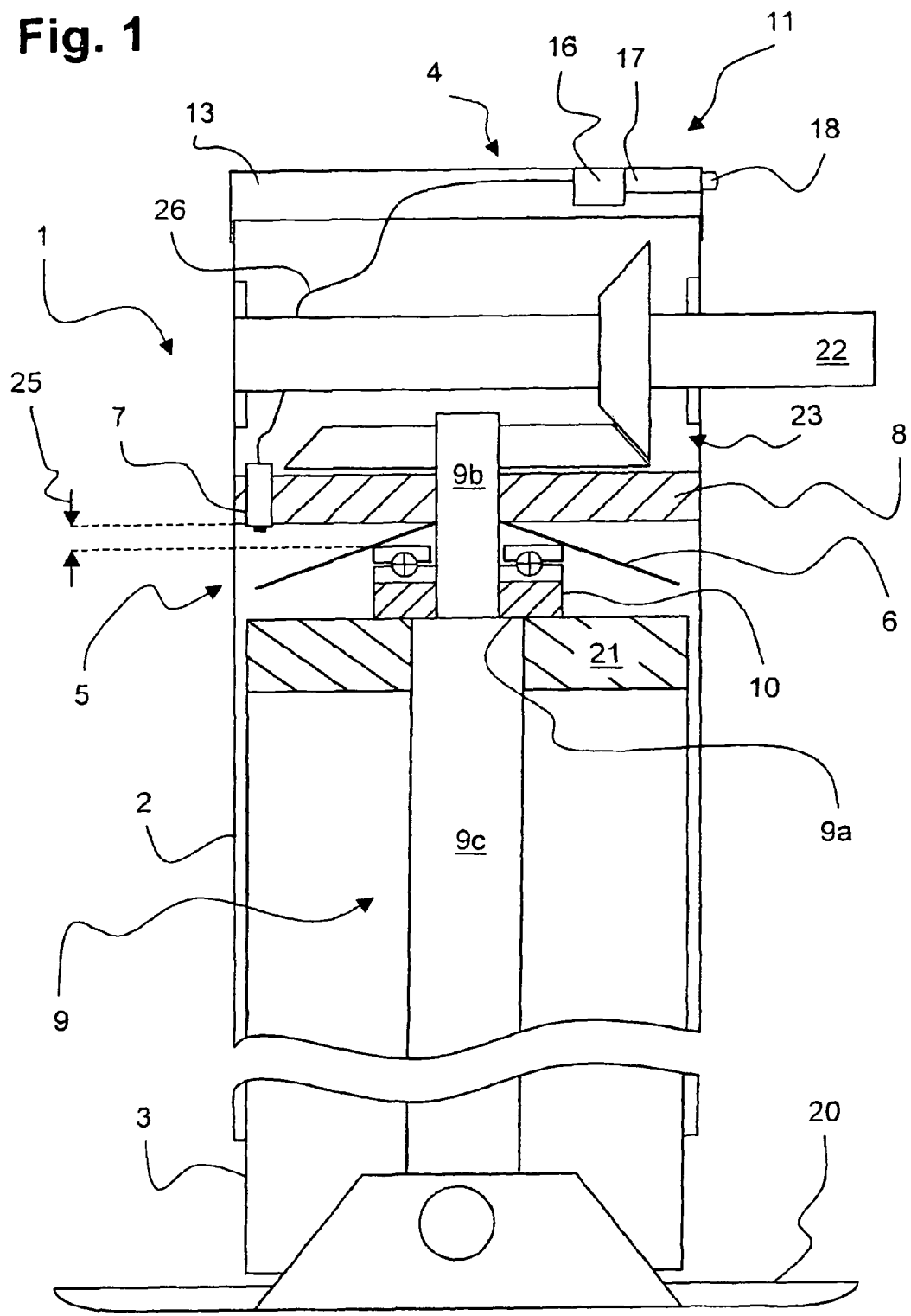
FIG. 1, a cross section through a support jack with supporting load indicator, not carrying a load.

FIG. 1 shows in a cross section a support element 1 of a support jack with a supporting load indicator 4, comprising an outer sleeve 2 and an inner sleeve 3 guided and able to move therein. At the lower end of the inner sleeve 3 is a support foot 20, which in the extended state of the support element 1 comes to bear against the ground (see FIG. 2).

The extending and retraction of the inner sleeve 3 occurs by turning of the input shaft 22, which is inserted into the outer sleeve 2 and mounted in the opposite lying walls. The torque of the input shaft 22 is transmitted by a bevel gear pair 23 to a spindle 9, which moves a spindle nut 21, arranged in the outer sleeve 2 without possibility of turning, in the lateral direction according to the direction of turning. The spindle nut 21 is installed in the inner sleeve 3 and moves the inner sleeve 3 in accordance with its path of travel.

The spindle 9 has an upper small-diameter segment 9b, which passes into a large-diameter-segment 9c in the region of a spindle shoulder 9a. The large-diameter segment 9c is provided with a thread. On the small-diameter segment 9b, a bearing ring 10 is shoved tightly in place and is not able to turn, while its lower side rests against the spindle shoulder 9a and is thereby also fixed by form fit in the downward direction. In the drawing of FIG. 1, the inner sleeve 3 is fully retracted, so that the spindle nut 21 thrusts against the bearing ring 10.

Beneath the pair of bevel gears 23, a bearing plate 8 passes through the outer sleeve 2, having in its middle region an opening to lead through the small-diameter segment 9b of the spindle 9. In the retracted condition of the support element 1, the spindle 9 is under tensile stress by the weight of the inner sleeve 3 and the support foot 20, so that a free space is produced between the bearing ring 10 and the bearing plate 8, resulting from a bearing play 25.

A spring element 6 in the form of a plate spring is inserted into the free space resulting from the bearing play 25. The plate spring is shoved onto the small-diameter segment 9b of the spindle 9 and has a conical shape, the ends being tilted downward in the radial direction.

A switch element 7 is installed in the bearing plate 8. This is a mechanical pushbutton, which is covered in the radial direction by the spring element 6, but does not make contact with it. The spring element 6 and the switch element 7 together form a pressure element 5, which is joined by a connection line 26 to a first indicator device 11.

The support element 1 is closed at its upper end by a housing cover 13. In the housing cover 13 is found the first indicator device 11, which besides the indicator element 18 contains an energy source 17, such as a commercial battery, and an evaluation unit 16.

Figure 2:
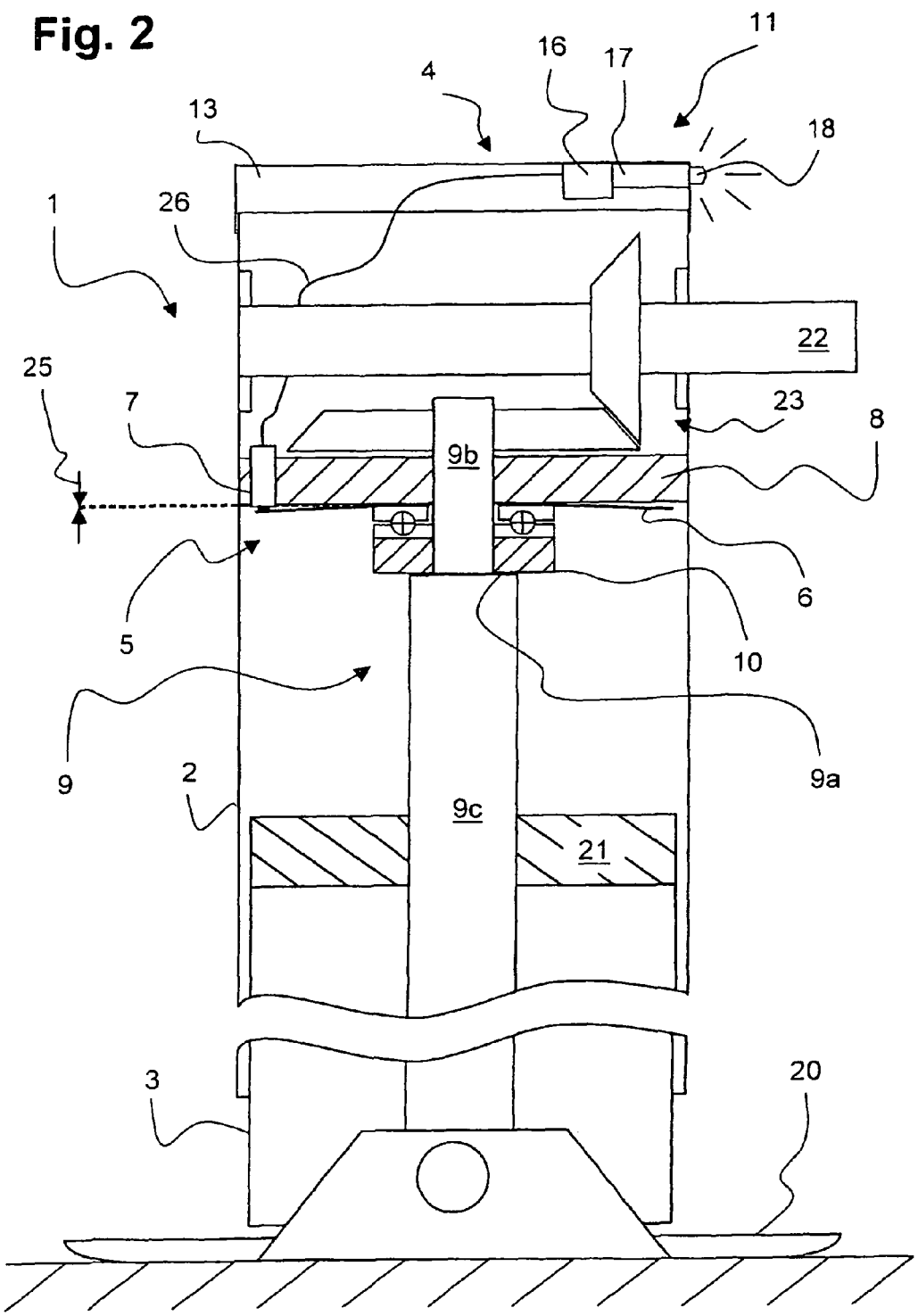
FIG. 2, a cross section through a support jack with supporting load indicator after exceeding the predetermined minimum support load.

FIG. 2 shows the support element 1 with one extended inner sleeve 3, with the support foot 20 placed on the ground. The spindle nut 21 has moved down into the outer sleeve 2, thereby pushing out the inner sleeve 3. In this position, the spindle 9 thrusts via the bearing ring 10 against the bearing plate 8 by virtue of the applied load, so that no more bearing play 25 is present. Only now does the bearing ring 10 fulfill its bearing function, since a turning is prevented by frictional connection with the bottom side of the bearing plate 8 and only the part of the bearing ring 10 bordering the small-diameter segment 9b turns along with the spindle 9.

The predetermined minimum load of the spring element 6 is exceeded in the drawing of FIG. 2. The spring element 6 is forced by the bearing ring 10 against the bearing plate 8 and is oriented largely parallel to the bearing plate 8 in the radial direction, so that the switch element 7 has been grasped by the spring element 6 and as a result the pressure element 5 has switched to a signal position. This signal position is shown to the operator by the indicator element 18 of the first indicator device 11.

Figure 3:
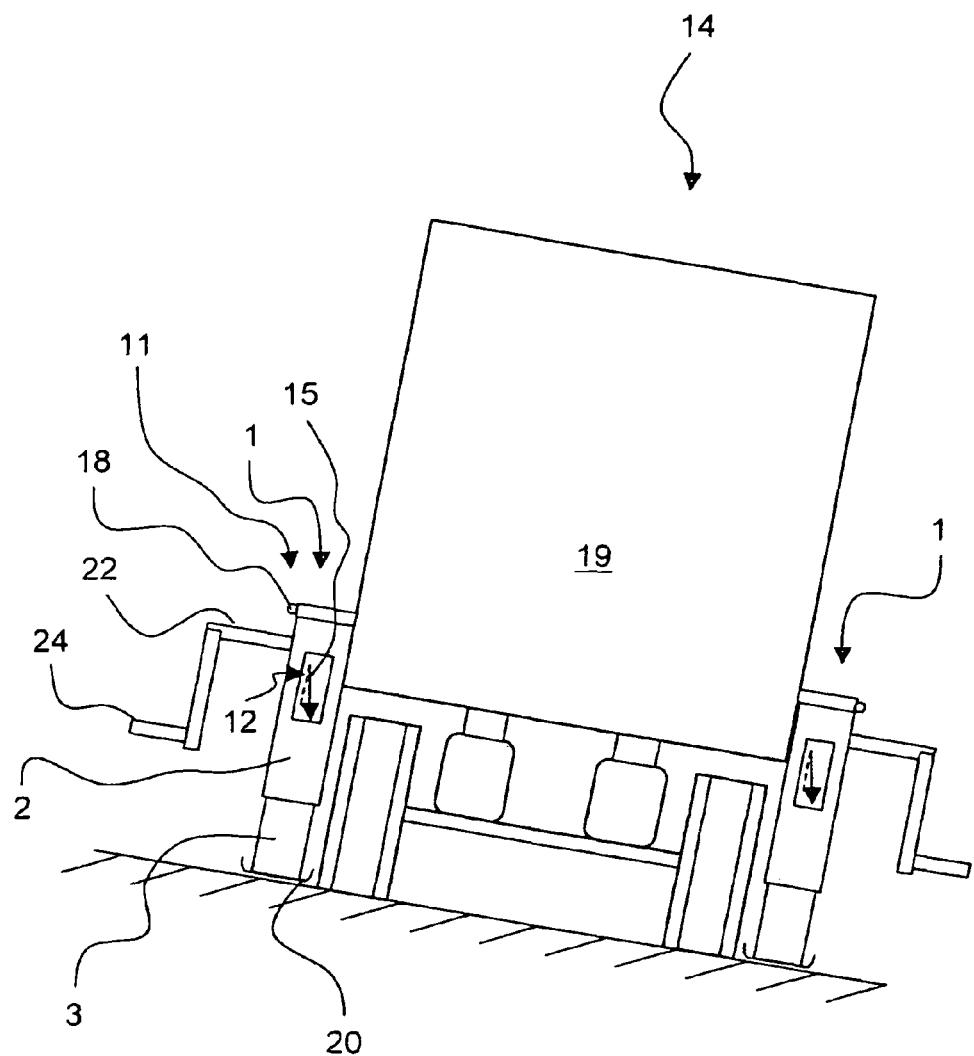
FIG. 3, a rear view of a vehicle standing crooked, with support jacks extended.

FIG. 3 shows a vehicle 14 from behind with a silo container 19 located on it, on a plane which is crooked relative to the lengthwise axis of the vehicle. On either side of the vehicle 14, one support element 1 is arranged at the side. The support elements 1 are largely the same in design and are partially extended, without the support feet 20 making contact with the ground. Accordingly, the vehicle 19 has a parallel orientation relative to the ground.

The sloping position of the vehicle 19 is picked up by a tilt indicator 15 and shown to the operator by means of a second indicator device 12, which is arranged on the outer sleeve 2 of the support element 1.

By further turning with an activating crank 24, the input shaft 22 is likewise made to turn and the inner sleeve 3 is further extended until the vehicle 19 has reached a horizontal position.

Figure 4:
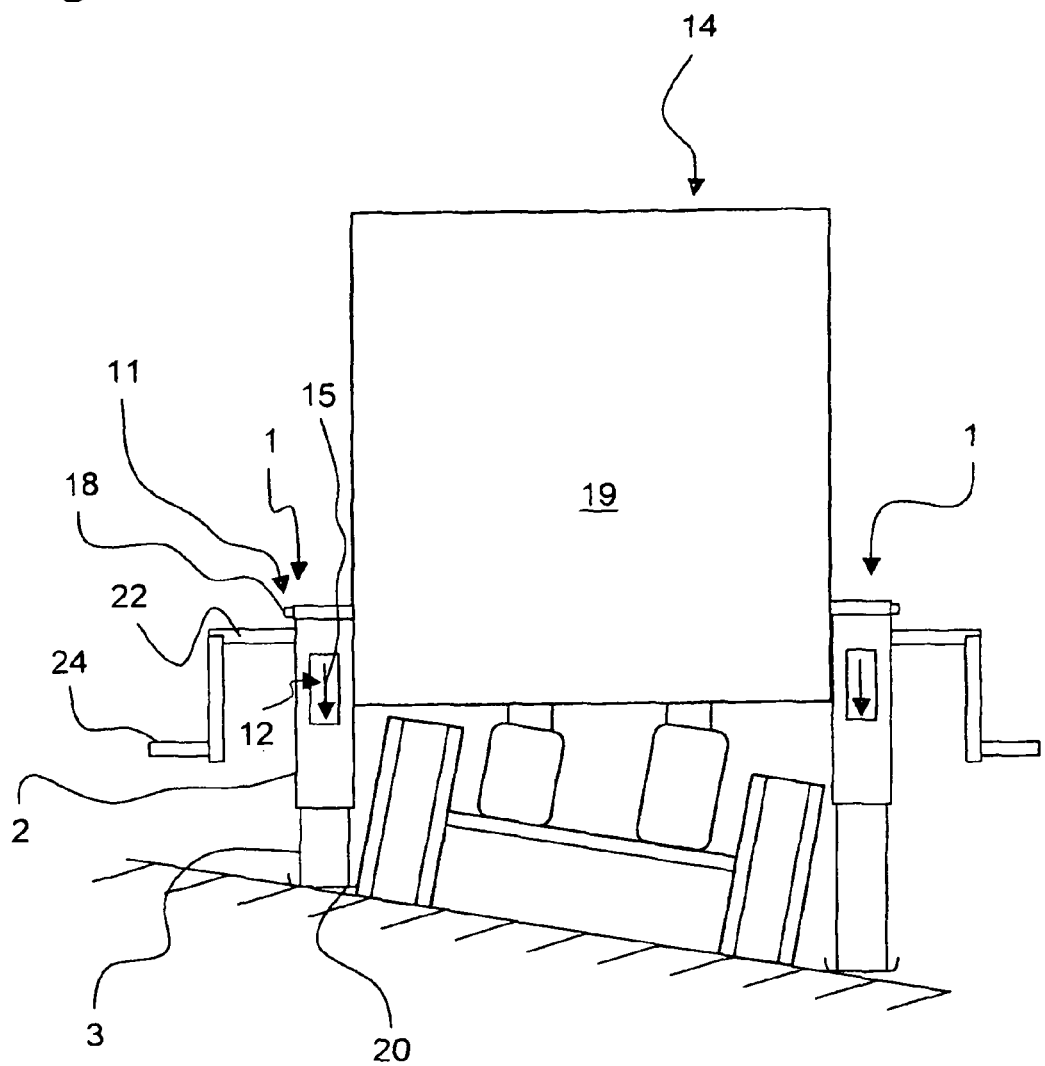
FIG. 4, a rear view of a horizontally oriented vehicle with support jacks extended.

The vehicle has reached the horizontal orientation in FIG. 4. Both support feet 20 of the support elements 1 are in contact with the ground and placed under load. The operator receives via the first indicator device 11 the information of load being present on the respective support element 1. The second indicator device 12 reports as to the side tilt of the vehicle 14. When both indicator devices 11, 12 have been operated, one can begin raising the silo container 19.

LIST OF REFERENCE SYMBOLS 1 support element
2 outer sleeve
3 inner sleeve
4 supporting load element 5 pressure element
6 spring element
7 switch element
8 bearing plate
9 spindle
9a spindle shoulder
9b small-diameter segment of the spindle
9c large-diameter segment of the spindle
10 bearing ring
11 first indicator device
12 second indicator device
13 cover of housing
14 vehicle
15 tilt indicator
16 evaluation unit
17 energy source
18 indicator element
19 silo container
20 support foot
21 spindle nut
22 input shaft
23 bevel gear pair
24 activation crank
25 bearing play
26 connection line

What is claimed is:

1. A support jack comprising:
a vertically telescopically displaceable support element having an outer sleeve and an inner sleeve, wherein a supporting load indicator with a pressure element is arranged on the support element, and the pressure element triggers a signal upon reaching a predetermined supporting force, wherein the pressure element comprises a spring element and a switch element cooperating with the spring element, wherein a bearing plate is arranged stationary in the outer sleeve, in which a spindle is held, which can move in the axial direction with respect to the bearing plate, and the spindle has a bearing ring, which thrusts against the bearing plate when a support force is initiated, and wherein the spring element is arranged between the bearing plate and bearing ring.

2. The support jack per claim 1, wherein the spring element is configured as a plate spring.

3. The support jack per claim 1, wherein the switch element is arranged in the bearing plate.

4. The support jack per claim 1, wherein the switch element is a mechanical pushbutton.

5. The support jack per claim 1, wherein the supporting load indicator is connected to a first indicator device.

6. The support jack per claim 5, wherein the first indicator device is arranged in a cover of the housing of the support element.

7. The support jack per claim 1, mountable on a vehicle, wherein the support element comprises a tilt indicator with a tilt sensor, which triggers a signal when it reaches a predetermined essentially horizontal orientation of the vehicle transverse to its direction of travel.

8. The support jack per claim 7, wherein the supporting load indicator and the tilt indicator are powered from a same energy source.

9. The support jack per claim 8, wherein the energy source is arranged in the support element.

10. The support jack per claim 1, wherein the tilt indicator or the supporting load indicator or a combination thereof is connected to an evaluation unit.

11. The support jack per claim 10, wherein a predetermined setpoint value is stored in the evaluation unit.

12. The support jack per claim 11, wherein the essentially horizontal orientation of the vehicle is reached at a setpoint value of +/−4°.

13. The support jack per claim 10, wherein the evaluation unit puts out a control signal, which acts on the control system of the vehicle in such a way that a tilting of a silo container is blocked or enabled.

14. The support jack per claim 7, wherein the tilt indicator is connected to the first indicator device or to a second indicator device or a combination thereof.

15. The support jack per claim 14, wherein the second indicator device is arranged on the support element.

16. The support jack per claim 15, wherein the first or second indicator device or a combination thereof has an optical or mechanical or acoustical indicator element or a combination thereof.

* * * * *